US011376687B2

(12) United States Patent
Valadon et al.

(10) Patent No.: US 11,376,687 B2
(45) Date of Patent: Jul. 5, 2022

(54) PROCESS FOR WELDING PARTS BY LINEAR FRICTION AND HEAT TREATMENT

(71) Applicant: Airbus Operations S.A.S., Toulouse (FR)

(72) Inventors: Stéphane Valadon, Toulouse (FR); Benjamin Dod, Toulouse (FR)

(73) Assignee: Airbus Operations S.A.S.

( * ) Notice: Subject to any disclaimer, the term of this patent is extended or adjusted under 35 U.S.C. 154(b) by 252 days.

(21) Appl. No.: 16/689,353

(22) Filed: Nov. 20, 2019

(65) Prior Publication Data
US 2020/0180065 A1 Jun. 11, 2020

(30) Foreign Application Priority Data
Dec. 10, 2018 (FR) ...................................... 18 72598

(51) Int. Cl.
*B23K 20/12* (2006.01)
*C22F 1/18* (2006.01)
*B23K 103/14* (2006.01)

(52) U.S. Cl.
CPC .......... *B23K 20/1205* (2013.01); *C22F 1/183* (2013.01); *B23K 2103/14* (2018.08)

(58) Field of Classification Search
CPC ............ B23K 20/1205; B23K 2103/14; B23K 20/122; C22F 1/183
See application file for complete search history.

(56) References Cited

U.S. PATENT DOCUMENTS

| 5,830,289 A | * | 11/1998 | El-Soudani | ............. | C22F 1/183 148/524 |
| 6,884,305 B1 | * | 4/2005 | Fujii | ....................... | C22C 14/00 148/521 |
| 8,146,795 B2 | * | 4/2012 | Bray | ...................... | B23K 33/00 228/2.1 |
| 2012/0027603 A1 | * | 2/2012 | Gindorf | ................ | F04D 29/023 416/213 R |

(Continued)

OTHER PUBLICATIONS

Li Wenya et al: "Abnormal microstructure in the weld zone of linear friction welded Ti-6.5Al-3.5Mo-1.5Zr-0.3Si titanium alloy joint and its influence on joint properties", Materials Science and Engineering A, vol. 599 (2014), pp. 38-45.

(Continued)

*Primary Examiner* — John A Hevey
(74) *Attorney, Agent, or Firm* — Lerner, David, Littenberg, Krumholz & Mentlik, LLP

(57) ABSTRACT

A process for welding a first part and a second part, includes: a linear friction step during which the two parts are rubbed against one another in a linear movement, a first cooling step during which the temperature of the parts thus welded is reduced to ambient temperature, a heating step during which the parts thus welded are heated to a temperature above a temperature of transition between a two-phase α-β field and a single-phase β field of the material constituting the two parts, and a second cooling step during which the temperature of the parts thus heated is reduced to ambient temperature. Such a process makes it possible to transform the structure of the welding zone and of the whole part thus produced into a lamellar α structure in a transformed β matrix which exhibits better damage tolerance.

2 Claims, 1 Drawing Sheet

(56) References Cited

U.S. PATENT DOCUMENTS

| | | | | |
|---|---|---|---|---|
| 2012/0233859 A1* | 9/2012 | Cattiez | ................ | F04D 29/324 |
| | | | | 29/889.7 |
| 2012/0279066 A1* | 11/2012 | Chin | ................ | F01D 5/005 |
| | | | | 219/121.64 |
| 2016/0146024 A1* | 5/2016 | Morris | ................ | F01D 5/187 |
| | | | | 228/104 |
| 2017/0022827 A1* | 1/2017 | Waldman | ................ | F01D 5/082 |

OTHER PUBLICATIONS

Wu Sujun et al, "Effect of Post Weld Heat Treatment on Microstructure and Fracture Toughness of Friction Welded Joint," J. of Wuhan University of Technology—Mater. Sci. Ed., vol. 31. No. 6 (Dec. 2016) pp. 1347-1351.

Baeslack et al, "Weldability of A Titanium Aluminide," Welding Journal, American Welding Society (Miami FL USA) vol. 68 No. 12 (Dec. 1989) pp. 483S-498S.

Wanying et al, "Effect of Different Heat Treatments on Microstructure and Mechanical Properties of Ti6Al4V Titanium Alloy," Rare Metal Materials and Engineering, vol. 46. No. 3 (Mar. 2017) pp. 634-639.

\* cited by examiner

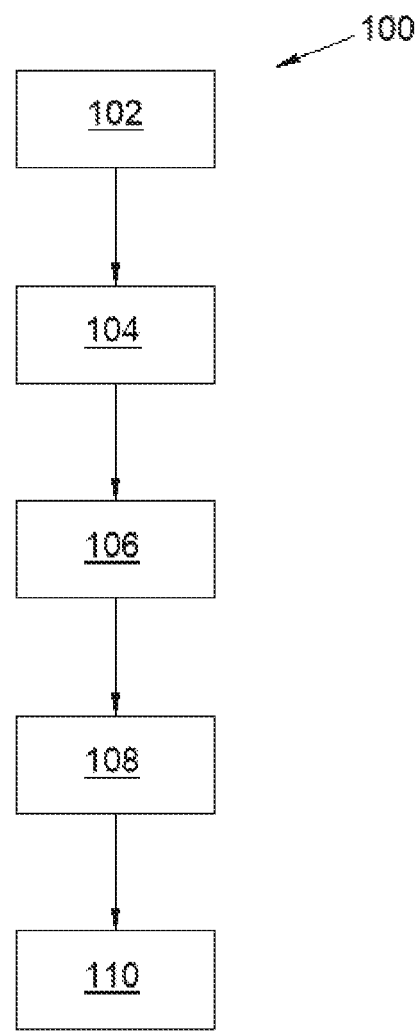

PROCESS FOR WELDING PARTS BY LINEAR FRICTION AND HEAT TREATMENT

FIELD OF THE INVENTION

The present invention relates to a process for welding parts by linear friction in combination with heat treatment.

BACKGROUND OF THE INVENTION

Linear friction welding is a solid-form welding process which consists in bringing parts into contact and in creating friction heating on the surfaces in contact by virtue of an oscillatory movement coupled to a lateral load. The heating and the pressure will bring about plastic movement of the substance, and the surfaces in contact will fuse. By cooling, the materials will solidify and weld together.

While such a welding process makes it possible to obtain assemblies of good quality, it may be desirable to find a process which makes it possible to improve the damage tolerance of the weld and of the whole part thus produced.

BRIEF SUMMARY OF THE INVENTION

An aspect of the present invention may provide a process for welding parts by linear friction and heat treatment, which comprises a step of heating the welding zone and the whole part thus produced in order to improve the properties thereof in terms of damage tolerance.

To this effect, a process for welding a first part and a second part is provided, said welding process comprising:
  a linear friction step during which the two parts are rubbed against one another in a linear movement,
  a first cooling step during which the temperature of the parts thus welded is reduced to ambient temperature,
  a heating step during which the parts thus welded are heated to a temperature above a temperature of transition between a two-phase α-β field and a single-phase β field of the material constituting the two parts, and
  a second cooling step during which the temperature of the parts thus heated is reduced to ambient temperature.

Such a process makes it possible to transform the microstructure of the welding zone and of the whole piece thus produced into a microstructure of lamella α phase in a transformed β phase, which exhibits better damage tolerance.

Advantageously, the first part and the second part are made of titanium alloy.

Advantageously, the welding process comprises, after the second cooling step, a reheating step during which the parts thus cooled are heated to a temperature below the transition temperature.

BRIEF DESCRIPTION OF THE DRAWINGS

The features of the invention mentioned above, and also others, will emerge more clearly on reading the following description of an implementation example, said description being given in relation to the appended drawing, in which:
  FIGURE schematically represents a welding process according to the invention.

DETAILED DESCRIPTION

The invention is more particularly described in the case of parts made of titanium alloy, such as for example the alloys denoted by the references Ti-64 or Ti-6242S. However, it can apply to other materials comprising a two-phase α-β field and a single-phase β field and a transition temperature between these two fields.

Initially, in the two-phase α-β field, the material has a globular-lamellar structure.

A principle of the invention lies in the fact that, if a material is heated above the transition temperature, the material passes from the two-phase α-β field to the single-phase β field, and that, if the material is cooled, the latter returns to the two-phase α-β field but retains certain properties of the single-phase β field. Indeed, the material reserves the large size of the grains of the single-phase β field, but each grain takes on a lamellar morphology: the α phase precipitates in a lamellar fashion in the β phase, so as to obtain a lamellar α phase in a transformed β matrix.

The titanium alloys of the Ti-64 or Ti-6242S type which have a microstructure of lamellar α phase in a transformed β matrix resulting from thermomechanical or heat treatment in the β field exhibit better damage tolerance than microstructures of the globular-lamellar type resulting from thermomechanical treatment in the α-β field.

FIGURE illustrates a process 100 for welding a first part and a second part wherein said welding process 100 comprises:
  a linear friction step 102 during which the two parts are rubbed against one another in a linear movement,
  a first cooling step 104 during which the temperature of the parts thus welded is reduced to ambient temperature,
  a heating step 106 during which the parts thus welded and cooled are heated to a temperature above the temperature of transition ("β transus") between the two-phase α-β field and the single-phase β field of the material constituting the two parts, and
  a second cooling step 108 during which the temperature of the parts thus heated is reduced to ambient temperature.

The transition temperature depends on the material used.

The friction step consists for example in fixing the first part and in moving the second part linearly while bringing into contact with the first part and pressing it against the first part.

Thus, regardless of the crystal structure of the parts initially, the two parts and also the welding zone have a microstructure of lamellar α phase in a transformed β matrix, which makes it possible to have a uniform assembly with better properties in terms of damage tolerance, compared with a microstructure of globular-lamellar type resulting from thermomechanical treatment in the α-β field.

Indeed, if initially the two parts or one of the two parts are parts made of titanium alloy of globular microstructure resulting from thermomechanical treatment in the α-β field, the heating step after welding will transform the complete assembly into titanium with a microstructure of lamellar α phase in a transformed β matrix.

If initially the two parts are made of titanium alloy with a microstructure of lamellar α phase in a transformed β matrix resulting from thermomechanical or heat treatment in the β field, the heating step after welding will again make uniform the complete assembly made of titanium with a microstructure of lamellar α phase in a transformed β matrix.

According to one particular embodiment of the invention, in the case of a Ti-64 titanium alloy, the features of the friction step 102 are the following:

the pressure applied between the surfaces in contact of the two parts is of the order of 90 MPa, the oscillations frequency is of the order of 50 Hz, the substance consumption during the welding is of the order of 3 mm, the oscillation amplitude is of the order of 2 mm.

According to one particular embodiment of the invention, in the case of a Ti-64 or Ti-6242S titanium alloy, the features of the heating step 106 are the following:

the heating temperature is of the order of 30° C. above the temperature of transition to the β field, and the duration of the heating step is at least 30 min.

The heating temperature is above the transition temperature and it is adjusted as a function of the size of the grains desired for the β phase.

The duration of the heating step is adjusted as a function of the size of the grains desired for the β phase.

The cooling rate of the second cooling step 108 is adjusted as a function of the mechanical properties desired for the assembly. Furthermore, if the cooling rate is slow, for example 1° C./min, the residual internal tensions in the assembly are minimized.

In order to reduce the residual internal tensions in the assembly, the welding process 100 optionally comprises, after the second cooling step 108, a reheating step 110 during which the parts thus cooled are heated to a temperature below the transition temperature.

For example, in the case of a Ti-64 titanium alloy, the features of the reheating step 110 are typically the following:

the heating temperature is of the order of 700° C., and the duration of the reheating step 110 is of the order of 2 h.

Preferably, the heating temperature is below or equal to 720° C. so as not to have a negative impact on the properties of the materials of the two parts. The duration of the reheating step 110 can in particular be in a range of from 1 h 30 to 6 h approximately.

Although the preceding description describes the welding of a first part and of a second part, the invention is not limited to the welding of two parts and it can also apply to the welding of a higher number of parts.

The invention claimed is:

1. A process for welding a first part and a second part, said welding process comprising:

a linear friction welding step during which the first and second parts are rubbed against one another in a linear movement;

a first cooling step during which the temperature of the first and second parts welded by linear friction is reduced to ambient temperature;

a heating step during which the first and second parts welded by linear friction are heated to a temperature above a temperature of transition between a two-phase α-β field and a single-phase β field of the material constituting the two parts such that the material of the first and second parts passes from a two-phase α-β field to single-phase β field; and a second cooling step during which the temperature of the first and second parts thus heated is reduced to ambient temperature such that α phase precipitates in a lamellar fashion in the β phase, so as to obtain a lamellar α phase in a β matrix, wherein the first part and the second part are made of titanium alloy.

2. The welding process according to claim 1, further comprising, after the second cooling step, a reheating step during which the first and second parts thus cooled are heated to a temperature below the temperature of transition between a two-phase α-β field and a single-phase β field.

* * * * *